United States Patent [19]
Adee

[11] 4,009,554
[45] Mar. 1, 1977

[54] WINDROWER HAVING SHIFTABLE TONGUE PIVOT

[75] Inventor: Raymond A. Adee, Newton, Kans.

[73] Assignee: Hesston Corporation, Hesston, Kans.

[22] Filed: Nov. 24, 1975

[21] Appl. No.: 634,829

[52] U.S. Cl. .................................... 56/1; 172/324; 280/456 R

[51] Int. Cl.² ........................................ A01D 73/00

[58] Field of Search ........................... 280/462–472, 280/456 R, 456 A; 172/324, 315, 316, 677, 679, 667, 741; 56/1, DIG. 1

[56] References Cited

UNITED STATES PATENTS

| 1,908,095 | 5/1933 | York et al. ........................ 280/463 |
| 2,597,121 | 5/1952 | McKay et al. .................. 280/462 X |
| 3,388,928 | 6/1968 | Poker et al. ..................... 280/456 R |
| 3,389,762 | 6/1968 | Mandekic ....................... 280/467 X |
| 3,832,837 | 9/1974 | Burkhart ........................ 280/463 X |

FOREIGN PATENTS OR APPLICATIONS 483,738   8/1953   Italy ................................ 280/456 A Primary Examiner—Joseph F. Peters
Assistant Examiner—John A. Pekar
Attorney, Agent, or Firm—Schmidt, Johnson, Hovey & Williams

[57] ABSTRACT

The rear pivot point of a swingable tongue on a towable implement can be shifted laterally with respect to the path of travel of the implement so that the latter can be offset on either side of the towing vehicle without requiring a tongue that is unduly lengthy or subjected to a severe draft angle.

10 Claims, 4 Drawing Figures

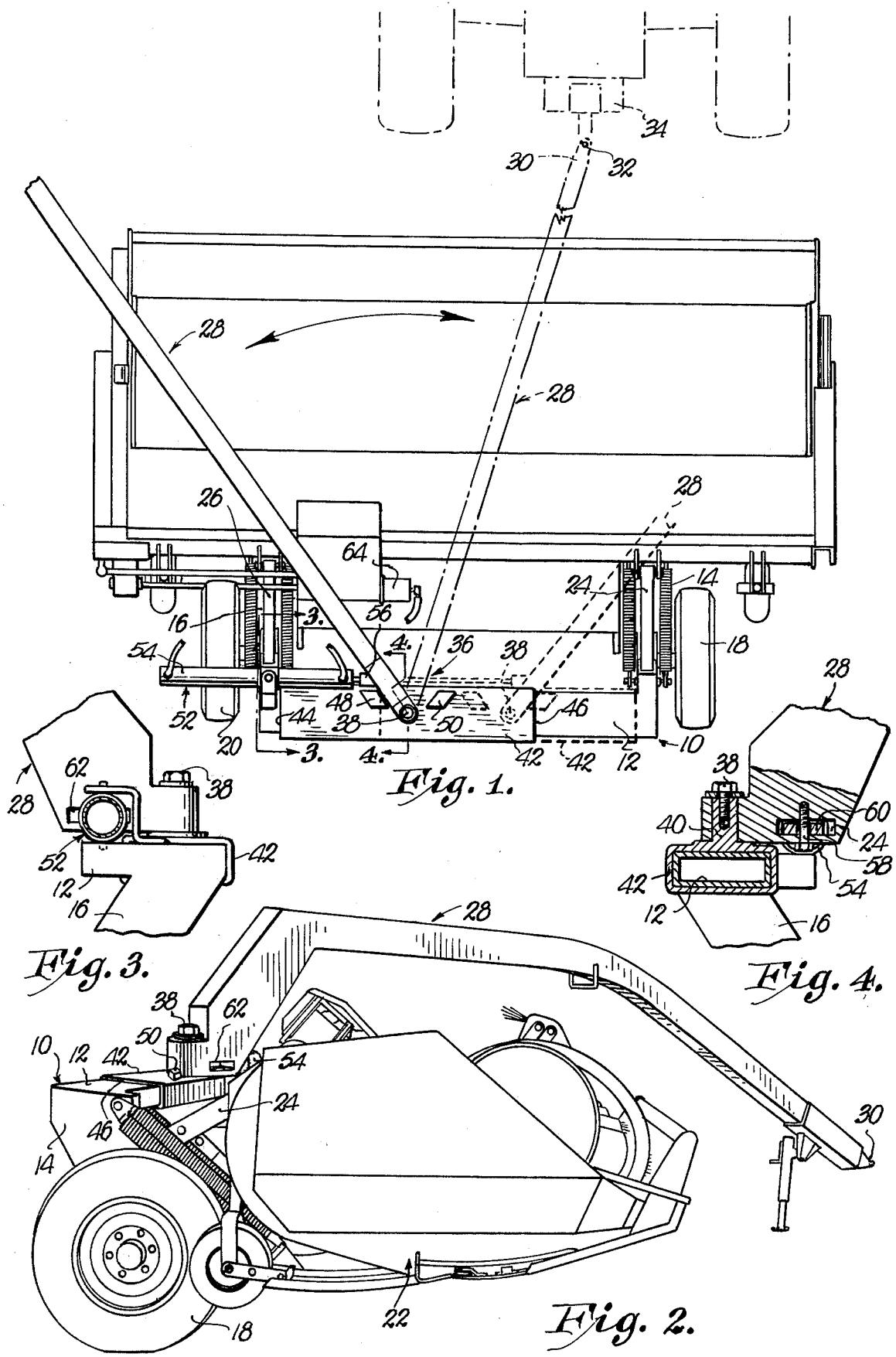

WINDROWER HAVING SHIFTABLE TONGUE PIVOT

This invention relates to towable implements and, more particularly, to those having long, slender, swingable tongues that permit the implements to be towed off to either side of a towing vehicle during field operations.

A pull-type windrower having its swingable tongue hydraulically shiftable from the tractor seat in order to change the angularity of the tongue relative to the frame of the implement, and thereby steer the same, is illustrated in U.S. Pat. No. 3,832,837, in the names of Burkhart et al, and assigned to the assignee of the present invention. The rear pivot point for the tongue in that patent is illustrated, by way of example only, at one lateral end of the implement so that the implement can be towed off to one side of the tractor during field operation or directly behind and in alignment with the tractor when moving through narrow gates or along the open road.

There are many times, however, when it would be desirable to selectively shift the implement off to either side of the tractor instead of being limited to one side only, such a situation being presented when the operator would like to move back and forth along one side of a field of crops being harvested instead of making a loop of progressively decreasing dimensions around the field. Locating the rear pivot point of the tongue near the lateral center of the implement and lengthening the tongue provides this desired flexibility, an example of such a "center pivot" machine being manufactured and sold by the assignee of the present invention under the trademark "HYDRO SWING" pull-type windrower. Another example of such a machine is illustrated in U.S. Pat. No. 3,868,811 to Cicci, et al.

Locating the rear tongue pivot at the lateral center of the implement, however, requires a longer tongue, as aforementioned, and increases the draft angle on the tongue beyond that which would be the case if the tongue were located at the lateral end most adjacent to the offset tractor. Consequently, more material must be used in fabricating the implement, greater weight is imparted thereto, and, if the angle is too severe, towing becomes difficult and there may be a tendency for the inside tractor tire to strike the tongue during a turn toward the side of the tractor on which the implement is located.

Accordingly, one important object of the present invention is to provide the flexibility of towing the vehicle offset to either side of the tractor but without the disadvantages of a lengthened tongue and a severe draft angle.

Pursuant to the foregoing, another important object of this invention is to provide a way in which the rear pivot of the tongue can be selectively shifted to either side of the lateral center of the implement, depending upon the direction in which the implement is to be offset.

A further important object of the invention is to accomplish both swinging of the tongue and lateral displacement of its rear pivot point through the use of a common actuator to simplify operation and reduce costs.

In the drawing:

FIG. 1 is a top plan view of an implement constructed in accordance with the principles of the present invention, the phantom lines indicating alternative positions for the swingable tongue and its associated structure;

FIG. 2 is a perspective view of the machine taken from the right front corner thereof;

FIG. 3 is an enlarged, fragmentary cross-sectional view of the machine taken substantially along line 3—3 of FIG. 1; and FIG. 4 is an enlarged, fragmentary cross-sectional view of the machine taken substantially along line 4—4 of FIG. 1.

The machine has a frame 10 which is generally of an inverted U-shaped configuration when viewed from the front or rear, having a horizontally extending crossbeam 12 (normally perpendicular to the path of travel of the machine), and a pair of legs or struts 14 and 16 depending downwardly and forwardly from opposite ends of beam 12. Ground wheels 18 and 20 secured to the lower ends of struts 14 and 16 respectively support frame 10 for advancement over the ground. By way of example, the frame 10 carries a crop windrowing header 22 forwardly of struts 14, 16 through a parallel linkage that includes top links 24, 26, bottom links (not shown), and one or more hydraulic cylinders (not shown). In this way, the header 22 is swingably mounted on the frame 10 for up-and-down movement between working and transporting positions.

An elongated, slender, upwardly arched tongue 28 has a hitch 30 at its forwardmost end and is connnected to the frame 10 at its rearmost end. The hitch 30 provides swinging movement of tongue 28 about a first upright axis 32 when hitch 30 is coupled to a tractor 34, while the connecting means 36 at the rear end of tongue 28 and forming the heart of the present invention, provides for swinging of the tongue 28 about a second upright axis coincident with the upright screw 38 as illustrated well in FIG. 4. Screw 38 attaches the tongue 28 to an upright pivot post 40 that is fixed to a tubular mount 42 which is rectangular in cross-section and which telescopically receives the crossbeam 12 of frame 10. Mount 42 is more than half the length of crossbeam 12 and can be shifted along the latter between the extreme positions illustrated in FIG. 1 where, on the one hand, the strut 16 serves as a stop which engages the corresponding end 44 of mount 42 and, on the other hand, the opposite strut 14 engages the corresponding end 46 of mount 42.

The tongue 28 is swingable about post 40 between two alternate extreme positions determined by spaced stops 48 and 50 located on opposite sides of post 40 and projecting above the upper surface of mount 42. Power for swinging tongue 28 between such positions is provided by a double-acting hydraulic piston and cylinder assembly 52 lying parallel to crossbeam 12 with its cylinder 54 firmly carried by strut 16 and its piston 56 pivotally coupled with tongue 28 slightly forwardly of post 40. The attachment means for piston 56 may, for example, take the form of a screw 58 which retains the perforated attachment end 60 of piston 56 within a transverse slot 62 in tongue 28 as best shown in FIG. 4. The piston and cylinder assembly 52 may be coupled with the hydraulic system of the tractor 34 in any suitable manner, utilizing the hollow tongue 28 as a fluid reservoir if desired, and a hydraulic motor 64 mounted on the header 22 is coupled to the same tractor system and provides driving power for the various operating components of header 22.

As the machine is being towed across a field such as for mowing a crop, conditioning it in heater 22 and then discharging it rearwardly to form a swath or windrow, the tractor 34 must be located off to one side of the machine so that tractor 34 is always operating in a previously mowed area. For example, the tongue 28 may be disposed in its 10 o'clock position illustrated in FIG. 1 so that the tractor 34 is off to the left of the crops entering header 22 as the machine is advanced.

As the operator reaches the end of one trip across the field he extends the piston 56 as he turns tractor 34 around in order to begin the next trip across the field in the opposite direction. Extension of piston 56 causes the tongue 28 to swing clockwise out of its 10 o'clock position in FIG. 1 until the stop 50 is engaged, whereupon continued extension of piston 56 causes the mount 42 to slide along crossbeam 12 until it reaches and engages the opposite strut 14. In this condition, then, the pivot point 38 of tongue 28 will be shifted substantially to the right of its previous position viewing FIG. 1, and the tongue 28 will be disposed at an approximate 2 o'clock position so that the tractor 34 is now disposed off to the right of the machine. With the machine and the tractor 34 laterally offset from one another in this manner, the operator can then begin moving back across the field with the tractor 34 in previously mowed areas while the machine moves in the standing crop. Upon reaching the end of the field, the operator reverses the above procedure, retracting the piston 56 so that the pivot point 38 becomes shifted along crossbeam 12 back to its original leftmost position viewing FIG. 1, and tongue 28 once again resumes its 10 o'clock position. This procedure is repeated many times over until the field has been completely mowed.

Should the operator desire to align the machine directly behind tractor 34 for movement from the field and along the open road, it is but necessary to extend or retract piston 56 an appropriate amount so as to locate the tongue 28 in an intermediate position between its two extremes, the tractor 34 being illustrated in phantom in such a relationship with the machine in FIG. 1.

Through the present invention the best of two worlds is obtained. On the one hand, the distinct advantage of being able to operate back-and-forth across the field, such as with a center pivot machine, is obtained, while on the other hand the advantage of having a less severe draft angle and shorter tongue, such as with a machine having the tongue pivot at one end of crossbeam 12, is obtained. Of course, it is not necessary for the operator to use the foregoing back-and-forth technique. He may find the shiftable pivot of the present invention an advantage simply because it affords increased maneuverability and permits him to circle the field with header 22 and frame 10 offset to either side of the tractor 34, moving clockwise or counterclockwise around the field as necessary or desirable.

Having thus described the invention, what is claimed as new and desired to be secured by Letters Patent is:

1. In a towable piece of mechanized equipment:
  a mobile frame;
  an elongated tongue provided with a hitch adapted to be coupled with a towing vehicle for swinging movement about a first upright axis;
  connector means remote from the hitch joining the tongue with the frame for swinging movement relative to the frame about a second upright axis and for reciprocable movement relative to the frame laterally of the normal path of travel of said equipment;
  power means for effecting said movements,
  said tongue having an arch between the connector means and said hitch; and
  a harvesting implement carried by the frame beneath said arch for up-and-down movement toward and away from the arch.

2. The invention of claim 1, and stop means limiting the extent of swinging movement of the tongue about said second axis.

3. The invention of claim 1, and stop means limiting the extent of said reciprocable movement of the tongue.

4. The invention of claim 3, and stop means limiting the extent of swinging movement of the tongue about said second axis.

5. In a towable piece of mechanized equipment:
  a mobile frame;
  an elongated tongue provided with a hitch adapted to be coupled with a towing vehicle for swinging movement about a first upright axis;
  connector means remote from the hitch joining the tongue with the frame for swinging movement relative to the frame about a second upright axis and for reciprocable movement relative to the frame laterally of the normal path of travel of said equipment; and
  power means for effecting said movements,
  said connector means including a mount reciprocable on the frame and pivot means attaching the tongue to the mount,
  said frame being generally U-shaped, presenting an elongated, normally horizontal beam and a pair of horizontally spaced legs depending from the beam,
  said mount surrounding the beam and being reciprocable longitudinally of the latter between the legs whereby said legs serve as stops limiting the extent of reciprocation of the mount.

6. The invention of claim 5; and a pair of horizontally spaced stops on the mount for limiting the extent of swinging movement of the tongue relative to the mount about said pivot means.

7. The invention of claim 6, said power means comprising a fluid pressure piston and cylinder assembly pivotally interconnecting the frame and the tongue.

8. The invention of claim 7; and a ground-engaging, equipment-supporting wheel on each leg respectively.

9. The invention of claim 8; and a windrower header carried by the frame ahead of said wheels and said beam for up-and-down swinging movement.

10. The invention of claim 9, said tongue being looped upwardly and forwardly from said pivot over the header.

* * * * *